March 19, 1974  B. HOLLENBECK  3,798,294

METHOD FOR PRODUCING BATTERY SEPARATOR SHEET

Filed Feb. 10, 1972

3,798,294
METHOD FOR PRODUCING BATTERY SEPARATOR SHEET
Bonderinko Hollenbeck, Pelham, N.H., assignor to
W. R. Grace & Co., Cambridge, Mass.
Filed Feb. 10, 1972, Ser. No. 225,205
Int. Cl. B29d 7/06, 27/00
U.S. Cl. 264—41                        5 Claims

ABSTRACT OF THE DISCLOSURE

A plastic material is formed into a sheet suitable for conversion into a battery separator. An extruded sheet is formed by calendering to produce projections on at least one surface and thereafter its thickness is made more uniform. The method preferably includes transporting the calendered sheet on the calendering roll to partially harden it. The sheet is removed from the calendering roll by withdrawing the projections substantially straight out of the depressions in the calendering roll. The plastic material is preferably oil filled.

BACKGROUND OF THE INVENTION

This invention relates to a method of forming sheets suitable for conversion into battery separators. More specifically, this invention relates to forming such sheets from plastic materials by calendering.

Battery separators have been formed in the past from the preferred plastic material of the present invention, which material is described in U.S. Pat. 3,351,495 owned by the same assignee as the present invention. Pat. 3,351,-495 shows the plastic material being formed into smooth surfaced battery separators. The plastic material of Pat. 3,351,495 also, in the past, has been extruded through a die having a ribbed configuration to produce a sheet suitable for conversion into a ribbed battery separator.

It is an object of the present invention to provide a method for producing a very uniform sheet of material suitable for conversion into a battery separator.

It is a further object of the invention to provide such a method that will produce a sheet having extremely uniform thickness dimensions so as to enable the use of the thinnest possible separator commensurate with the necessary separation of the battery plates and provision of adequate channels for the escape of gas formed within the battery.

It is a still further object of the invention to provide such a method that can be expeditiously practiced using relatively simple and inexpensive equipment.

SUMMARY OF THE INVENTION

By an aspect of the invention, a method is provided for continuously producing a sheet suitable for conversion into a battery separator and having two principal opposite surfaces, at least one of which has a series of spaced apart projections thereon. These projections may be ribs extending transversely across the sheet. In other instances the projections may be mounds projecting upwardly from the primary surface of the sheet. In any event the process involves delivering a mass of readily deformable plastic material, preferably in self supporting sheet form having relatively plain opposite surfaces, to a calendering means where the plastic material is calender molded. Preferably, the molding takes place between two calendering rolls at least one of which has depressions formed therein that are interrupted circumferentially and spaced around the circumference of the roll. Preferably, the thus formed sheet is then sized by being subjected to pressure, preferably by being passed between two sizing rolls that have a preset sizing gap therebetween. At least one of the sizing rolls presses the projections inwardly of the sheet to set the final sheet thickness.

In the preferred operation of the invention, a very small bank of material from the extruded sheet is maintained at the nip of the calendering rolls. Preferably, this bank is maintained at a low level. It is also generally necessary to transport the calendered sheet around at least a portion of the circumference of the depression containing calendering roll and to partially harden the sheet. Then the partially hardened projections are withdrawn substantially straight out of the depressions to prevent any substantial deformation or picking of the projection structure.

DESCRIPTION OF THE PREFERRED EMBODIMENTS

Figure 1:
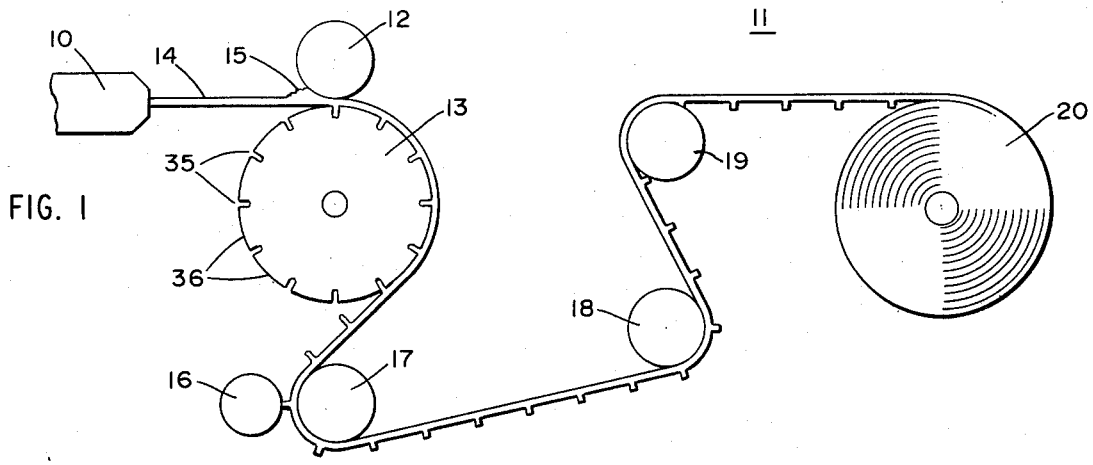
FIG. 1. A diagrammatic representation of a system for producing articles under the principles of the present invention.

Referring first to FIG. 1 of the drawings and discussing the use of the invention which is considered to be the most readily practicable, a sheet extruding die 10 of the apparatus 11 may be seen. The apparatus 11 also includes two calendering rolls 12 and 13. A sheet 14 of plastic material is extruded by the extruder and supplied to the nip of the calendering rolls 12 and 13. A small bank 15 of material is maintained at the nip of the rolls 12 and 13. Two sizing rolls 16 and 17 are provided downstream of the calendering rolls 12 and 13. Sizing roll 17 also serves as a transporting roll receiving the sheet 14 which passes under the sizing roll 16. Additional cooling rolls 18 and 19 and a wind up roll 20 may also be seen in FIG. 1.

Figure 2:
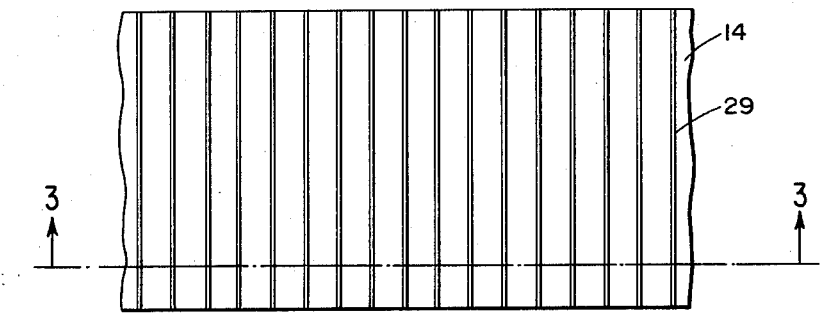
FIG. 2. An enlarged, diagrammatic fragmentary representation in top plan view of a battery separator sheet material produced according to my invention.
Figure 3:
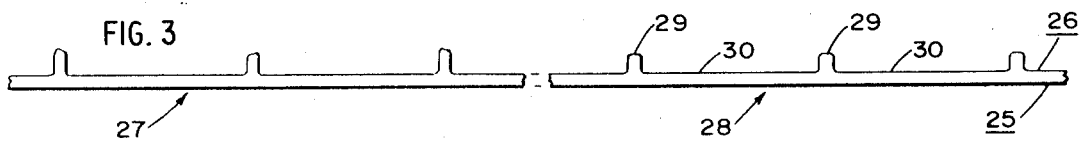
FIG. 3. A sectional view on line 3—3 of FIG. 2.

By the application of the method of the present invention, a sheet suitable for conversion into a battery separator may be expeditiously continuously produced. A preferred form of the linier sheet 14 is shown in FIGS. 2 and 3. The sheet has two principal opposite surfaces, 25 and 26, one of which is planar (25) and the other (26) of which has a continuous series of upstanding spaced apart transverse ribs thereon. The ribs 29 extend upwardly from the base level 30. The sheet is commonly somewhat lacking in total thickness uniformity as it is separated from the calendering roll 13. This is illustrated at part 27 of FIG. 3. The sheet is then sized for uniform thickness and ends up as illustrated at part 28 of FIG. 3.

Turning now to a more detailed discussion of the apparatus 11 and its operation, a plastic material, preferably an oil filled plastic material such as is shown in Example 2 of U.S. Pat. 3,351,495, is extruded substantially as described in Patent 3,351,495. The sheet is extruded in self supporting, easily deformable and relatively plain form as shown in FIG. 1. By relatively plain it is not meant to indicate that the sheet does not contain ripples and other irregularities of substantial amplitude due to serging at the die and irregular die lip construction, etc. In fact, with the present process a considerable amount of such irregularity can be tolerated because of the specific preferred calendering procedure of my invention.

The self supporting sheet is drawn through an air gap between the die 10 and the calendering rolls 12 and 13 and received in the nip of the calendering rolls. The calendering rolls draw the sheet away from the die 10. Both of the calendering rolls are driven and they have synchronized surface speeds. In other words, the surfaces of the calendering rolls have the same rate of movement even though the r.p.m. of the smaller calendering roll 12 would obviously be higher than that of the larger roll 13. The calendering rolls 12 and 13 are preferably operated at a constant gap to manufacture a sheet of close to uniform thickness.

Calendering roll 13 has a plurality of transverse grooves 35 separated by lands 36 and spaced evenly around the circumference thereof. As the material in the sheet 14 passes between the calendering rolls, it is roll molded. The planar side or surface 25 of the sheet is formed against the smooth roll 12 and the ribbed side or surface 26 is formed against the roll 13 which has the grooves or channels therein.

Calendering roll 13 is normally warm—about 50° to 200° F. would be considered the preferred warm temperature. The other calendering roll 12 generally has a smooth calendering surface and is hot, about 225° to 275° F. would be considered hot, preferred and operable with the preferred plastic materials. About 240° F. is the most preferred temperature of operation for calendering roll 12.

Calendering roll 12 may have heat supplied to it internally by means such as steam or hot water. Calendering roll 13 receives sensible heat from the sheet 14 and may be cooled internally with water to maintain its optimum operating temperature.

The calendered sheet is preferably transported around at least 20% of the roll 13 and is shown extending around approximately 50% of the circumference of the grooved roll 13. Roll 13 serves as a transporting roll and partially hardens the sheet, including the ribs, during its movement due to the sheets dwell time or residence time in contact with the roll. This is necessary to provide some stiffness to the sheet and integrity in the ribs prior to their withdrawal from the molding surface. The sheet, however, is not entirely hardened or set because it is necessary to have some maleability for subsequent treatment as shall be described hereinafter. By set, it is here meant to refer to establishing a relatively static state in the sheet. "Set" as used here does not refer to heat set plastic, although in special instances such a plastic might be used. Instead the word set is used in this application to include the hardening of thermoplastics such as the preferred high density polyethylene material described in U.S. Pat. 3,351,495 as previously referred to. The heating of the roll 12 has been found useful, in preventing a leathery character and other molding defects from occurring on the planar side of the sheet.

Turning our attention now for a moment to considering how accommodations are made for the irregularities formed in the die area during extrusion as previously referred to, a very small bank 15 of the plastic material from the extruded sheet is maintained at the nip of the calendering rolls 12 and 13. For the most efficient operation of my process, without the requirement of extremely high pressures for maintaining the calendering rolls with the desired spaced apart gap, it is desirable to maintain this bank at a very low level. Thus it is important to maintain a careful balance in the thickness of the sheet extruded and the spacing of the calendering rolls 12 and 13. In a particular run the extruded sheet has an average thickness of 40 mils in the air gap, the bank plus the sheet at its highest point in the nip of the calendering rolls has an average thickness of 50 mils and the base thickness of the sheet when it passes from the calendering rolls is an average of 12 mils with an average rib height above the base surface of 40 mils.

To separate the sheet 16 from the calendering roll 13 with the least distortion of the sheet's thickness uniformity it is necessary to withdraw the partially hardened ribs from the grooves one at a time, substantially straight out of the grooves in a manner not unlike disengaging gears and at a takeaway the same as or only very slightly greater than the speed at which the calendered sheet is transported by the grooved roll 13. If the takeaway is not a little faster than the transport speed of the calendering roll 13, the sheet will tend to go lax because it is not entirely hardened and may stretch slightly. This above described cooling and removal process has been found to prevent substantial deformation and picking of the rib structure before the sheet has been entirely set.

The sheet passes from the transport roll 13 to the transport roll 17 which engages the planar side of the sheet. The transporting roll 17 is preferably maintained cold and begins the final setting of the sheet immediately upon its engaging the sheet. The sheet is passed under the sizing roll 16 that has the same surface speed as the roll 17. The sheet is thus trapped in a preset sizing gap between the sizing roll 16, which is preferably cool, and the cold sizing transporting roll 17. It should be understood that the sheet is delivered between the two sizing rolls before it has entirely set or hardened and no heat is supplied to the sheet during the preferred sizing procedure. In fact, at least one of the sizing rolls is normally maintained cold. However, in special instances it may be desirable to warm roll 16 which would heat the outer end or tip of the ribs.

The sizing roll 16 impinges against the top of the ribs, one rib at a time, pushing against the top of the ribs to set the final thickness of the sheet from the rib top to the outer planar surface of the sheet. Of course with rolls 16 and 17 both being driven they both actually serve to draw the sheet away from the roll 13 and move it over the transporting roll 17 which is downstream from the roll 13. The sheet is passed from the transporting roll 17 to the wind up roll 20 which draws it away from the transporting roll 17. If desired or necessary to complete the set of the sheet, the sheet may be drawn over additional cooling rolls 18 and 19 as shown in FIG. 1. Of course, other means of further cooling may be employed. For example, the sheet may be moved a long distance at room temperature to allow additional cooling time. In some instances further cooling may be unnecessary. In any event, the sheet is further cooled if necessary to complete its set.

Turning now to additional features of the invention, an oil filled composition seems to respond particularly well when it is oil filled to above 30%, more preferably above 65%, by volume prior to extrusion and the oil is retained in the sheet during the recited method sequence. Thus the oil filled composition is formed into a thin sheet. Then pressure is applied via the calendering rolls 12 and 13 and at least one side of the sheet is deformed into projections before the sheet is set and before the sheet is leached. Thereafter and still prior to setting and leaching, the sheet is sized to a predetermined thickness by mashing the projections inwardly and toward the other side of the sheet. Thereafter the thickness dimension of the sheet is set, after which the sheet is leached to remove at least part of the oil.

Figure 4:
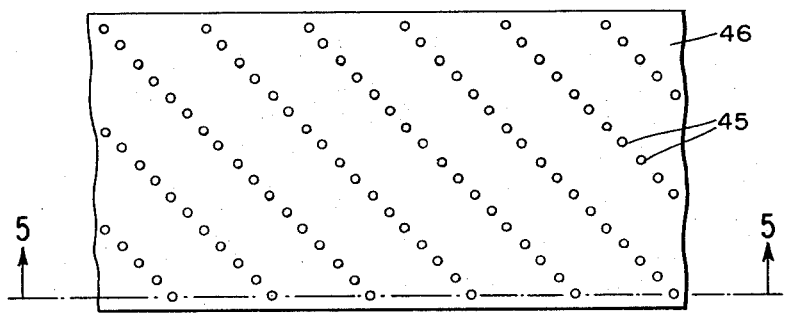
FIG. 4. An enlarged, diagrammatic fragmentary representation in top plan view of a different battery separator sheet material produced according to my invention.
Figure 5:
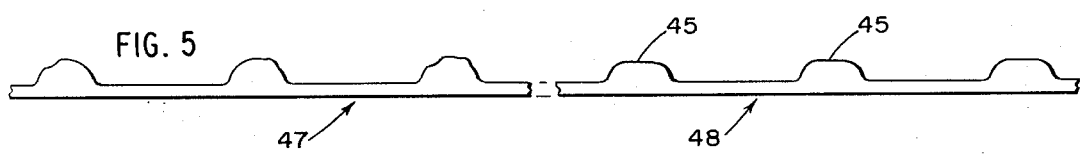
FIG. 5. A sectional view on line 5—5 of FIG. 4.

Many variations are possible in the application of the invention and some of them are alternate preferred species, for example the calendering roll 13 may have a series of depressions shaped like relatively rounded pits rather than like ribs. Under these conditions the sheet of FIGS. 4 and 5 would be produced and it will be understood that the depressions in roll 13 would be the opposite of the projections 45 on the sheet 46. As with the prior linear sheet, there is some irregularity normally present in the first calendered, loaded sheet, as shown at region 47 in FIG. 5, which is corrected by the sizing rolls 16 and 17 as illustrated at 48 of FIG. 5. It is desirable, although less critical because of the more rounded shape of the projections, to withdraw the sheet from the molding calendering roll in the same manner as the previous sheet was withdrawn with the projections being pulled substantially straight out of the depressions.

Besides variations in the type of projections various rib spacings can also be employed. The rib pattern generally repeats sequentially along the linear sheet. In some instances it may be desirable to provide a pattern on roller 12 and provide a pattern of structures on both sides of the sheet 14. It may also be desirable in some instances to provide a matching pattern on the sizing rolls to receive the calendered structure to more carefully size the sheet. In certain instances it is also possible to change the thickness of the finished sheet at the sizing rolls by adjusting the gap therebetween. Thus without change, the calendering rolls 12 and 13 can be utilized to produce sheets that have slightly different end thickness requirements.

By extruding a sheet of material containing an amount of plastic averaging out in an approximation of the amount of material needed for the final sheet, an extremely high quality and uniform sheet can be produced with relatively basic and inexpensive equipment. The secondary roll sizing operation further inhances this capability. And this combined with the system for removal of the sheet from the calendering roll and the use of a highly oil filled plastc provides the ultimate in this capability. Among other things, the small bank 15 at the nip of the calendering rolls serves to minimize quality variation which could be caused by chain alignment in high molecular weight polymers.

The process works well even with the high inorganic solids filling contained in the plastic material, which is surprising. The preferred plastic material as taught in Pat. 3,351,495 contains 5 to 60 volume percent of an inert filler material and the preferred embodiment contains 15 volume percent filler. The patent further gives dry, finely divided silica as the preferred filler. Thus the process includes operation with plastic compositions containing very substantial quantities of inert inorganic solids.

In other special situations the method of the invention may be applied to the production of non-oil filled battery separator sheet material although it is by far most expeditiously workable with the present preferred plastic material as already stated. In particular the invention may in some instances be applied to the very highly plasticized polymer system using materials other than oil. It will be obvious to those skilled in the art that in special situations various combinations of portions of my overall invention may be used with certain steps omitted. Patterned sheets produced according to my invention may also have other special uses than as battery separators where, for example, another patterned porous membrane of similar characteristics is desired. It will thus be obvious that many changes and modifications may be made without departing from the true spirit and scope of the invention and it is, therefore, aimed in the following claims to cover all such equivalent variations as fall within the true spirit and scope of the invention.

I claim:

1. A process for continuously producing a porous sheet membrane suitable for conversion into a battery separator and having two principal opposite surfaces, one of which is planar and the other of which has a continuous series of spaced apart projections thereon comprising extruding a self supporting easily deformable relatively plain sheet of thermoplastic material, said thermoplastic material being oil filled to above 30% by volume; calender molding said sheet between two calendering rolls having synchronized surface speeds, one of said calendering rolls having depressions that are interrupted circumferentially and spaced around the circumference thereof and being warm and the other of said calendering rolls having a smooth calendering surface and being hot, said planar sheet surface being formed against said calendering roll having said smooth calendering surface and said sheet surface having said continuous series of spaced apart projections being formed on said calendering roll having said depressions; forming a very small bank of said material from said extruded sheet at the nip of said calendering rolls and maintaining said bank at a low level; transporting the calendered sheet around at least 20% of the circumference of said calendering roll having said depressions and partially hardening said calendered sheet including said projections; withdrawing said partially hardened projections from said depressions, substantially straight out of said depressions and at a rate of takeaway very slightly greater than the speed at which said calendered sheet is transported by said calendering roll having said depressions to prevent substantial deformation and picking of said projection structure; before said sheet has entirely set engaging the planar side thereof with a transporting roll and passing said sheet under a sizing roll that has the same surface speed as said transporting roll and trapping said sheet in a preset sizing gap between said sizing roll and said transporting roll with said sizing roll impinging against the top of said projections and pushing against the top of the projections and permanently deforming said projections and reducing their height above the surface from which they project and thereby setting the final thickness of said sheet from the top of said projections to the outer planar surface; thereafter further cooling said sheet to complete its set and thereafter leaching at least part of said oil from said sheet to form said porous membrane.

2. The method of claim 1 wherein said depressions in the calendering roll are transverse grooves and said projections are upstanding ribs extending sequentially transversely across said sheet, said sheet being a linear sheet, and said sizing roll impinging against the tops of said ribs one at a time.

3. The method of claim 1 wherein said sizing roll is cool and said transporting roll is cold.

4. The method of claim 1 wherein said thermoplastic material is filled to above 5% volume with an inert filler material.

5. The method of claim 4 wherein said thermoplastic material is oil filled to above 65% by volume and filled to 15% by volume with an inert finely divided silica filler.

References Cited

UNITED STATES PATENTS

| | | | |
|---|---|---|---|
| 3,351,495 | 11/1967 | Larsen et al. | 260—28.5 A |
| 3,551,544 | 12/1970 | Hlinka | 264—175 |
| 3,484,835 | 12/1969 | Trounstine et al. | 264—284 X |
| 2,410,744 | 11/1946 | Powers | 264—284 X |
| 3,089,191 | 5/1963 | Conrad | 264—175 UX |
| 3,085,292 | 4/1963 | Kindseth | 264—175 X |

FOREIGN PATENTS

| | | | |
|---|---|---|---|
| 527,464 | 7/1956 | Canada | 264—284 |

JEFFERY R. THURLOW, Primary Examiner

U.S. Cl. X.R.

264—175, 210 R, 284